No. 682,954. Patented Sept. 17, 1901.
N. OLSON.
FISHING BOB.
(Application filed July 29, 1901.)
(No Model.)

Witnesses
O. M. Simpson
Chas. S. Hyer

Nels Olson Inventor
by C. A. Snow & Co.
Attorneys

THE NORRIS PETERS CO., PHOTO-LITHO., WASHINGTON, D. C.

UNITED STATES PATENT OFFICE.

NELS OLSON, OF BURLINGTON, IOWA.

FISHING-BOB.

SPECIFICATION forming part of Letters Patent No. 682,954, dated September 17, 1901.

Application filed July 29, 1901. Serial No. 70,168. (No model.)

*To all whom it may concern:*

Be it known that I, NELS OLSON, a citizen of the United States, residing at Burlington, in the county of Des Moines and State of Iowa, have invented a new and useful Fishing-Bob, of which the following is a specification.

This invention relates to fishing-bobs; and the object of the same is to provide simple and effective means in connection therewith to facilitate its attachment to and adjustment on a line, the latter being guarded at its points of engagement, so that when drawn through or located in moss-beds, large leaves, or any kind of weeds the line cannot become disengaged from the bob, yet when manually operated the said line can be easily detached.

The invention consists in the construction and arrangement of the several parts, which will be more fully hereinafter described and claimed.

Figure 1:
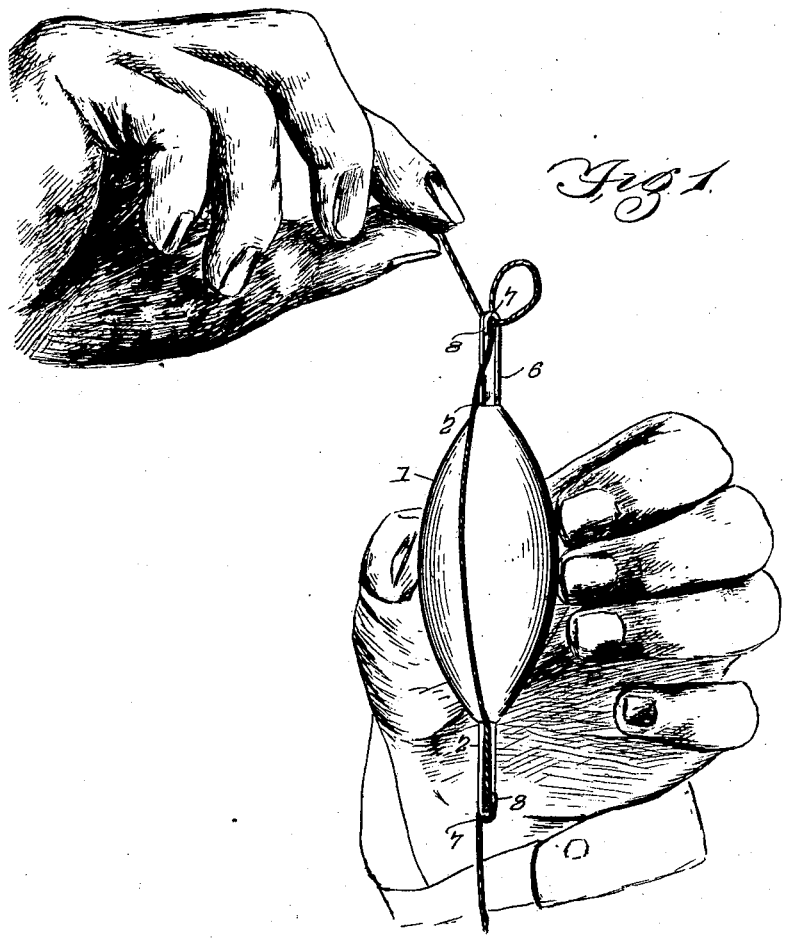
Figure 2:
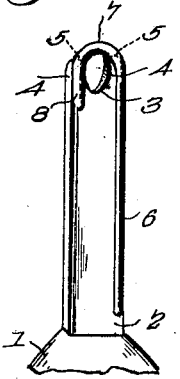
Figure 3:
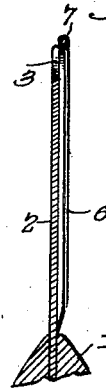

In the drawings, Figure 1 is a perspective view of the improved bob, showing the manner of arranging the line in connection therewith. Fig. 2 is a perspective view of one of the extremities of the bar forming the guard means at one end of the improved bob. Fig. 3 is a transverse vertical section of the said extremity.

Similar numerals of reference are employed to indicate corresponding parts in the several views.

The numeral 1 designates an elongated body of the usual form and constructed of cork or other suitable material. Inserted through the said body is a flat bar 2, formed of suitable metal, preferably brass, the said bar being projected beyond the terminals of the body and formed with curved recesses 3 in the ends. The two arms 4, provided by the formation of the recesses, have rounded ends 5 to prevent cutting or abrading the line by removing sharp corners or edges. On the extremities of the bar beyond the terminals of the body spring-shanks 6 are secured for a portion of their length, the said shanks being held adjacent to one side edge of each bar extremity and in reverse positions on the opposite extremities, so as to facilitate the application of the line and more reliably attain the function desired. The shanks each have a hook 7 at the free end, which lies over the outlet of the recess 3 and forms with the latter an eye, the free terminal 8 of the hook being straight and normally extending parallel with the edge of the bar extremity opposite to that to which the shank is adjacent, and by this means a combined eye and guard is formed at each end of the bar. The shank and hook in each instance will be constructed of stiff resilient material, preferably brass wire, and it will be observed that there are no catching angles or projections at either end of the bob, and it will therefore be permitted to slide through obstructions—such as grass, weeds, leaves, and the like—without offering any material resistance, and the line in connection with the eyes will be prevented from pulling out or becoming disconnected.

In applying the line to the improved device it is pushed under the straight terminals 8 of the hooks 7, and to prevent the bob from slipping the line is looped in each combined eye and guard, as shown by Fig. 1, the adjustment of the bob to compensate for the depth required being readily obtained by loosening the loops of the line and shifting said bob on the latter. It will be seen that the line cannot become disengaged from the combined eyes and guards, as the terminals 8 will always be held close to the bar extremities and the line cannot become entangled, snag, or get out of place, and in applying the line it is obviously preferable to first connect it to the eye that will be at the lower end of the bob and then attach it to the upper eye.

The bar, shanks, and hooks of the latter will be plated or nickeled, and the body 1 may be ornamented or painted, as desired.

Changes in the proportions, size, form, and minor details may be resorted to without departing from the principle of the invention.

Having thus described the invention, what is claimed as new is—

1. In a bob of the class set forth, the combination of a body having a flat bar extending therethrough and provided with terminal recesses, and spring-hooks extending over the recessed ends of the bar and forming combined eyes and guards.

2. In a bob of the class set forth, the combination of a body having a flat bar with recessed ends, and reversely-arranged spring-hooks extending over the said ends of the bar and forming combined eyes and guards.

3. In a bob of the class set forth, the combination of a body having a flat bar with recessed ends, and a straight shank secured along one side edge of each bar extremity and having a hook over the recessed end and a straight terminal loosely bearing on the bar close to the opposite side edge for a short distance, whereby a combined eye and yielding guard will be provided.

4. A bob having a flat bar with a recessed end and a resilient closing-hook for said end having a terminal loosely bearing against an adjacent portion of the bar.

In testimony that I claim the foregoing as my own I have hereto affixed my signature in the presence of two witnesses.

NELS OLSON.

Witnesses:
NILS ANDERSON,
H. J. YALEY.